United States Patent
Rosenørn et al.

(10) Patent No.: US 12,215,888 B2
(45) Date of Patent: *Feb. 4, 2025

(54) AIR TREATMENT METHOD AND A SYSTEM ARRANGED FOR TREATING AIR IN A CLEAN ROOM

(71) Applicant: AIRLICH IP ApS, Allerød (DK)

(72) Inventors: Thomas Rosenørn, Birkerød (DK); Jonas Ingemar, København N (DK); Andrew Butcher, Brønshøj (DK); Cecilie Litske Carstens, København V (DK)

(73) Assignee: AIRLICH IP ApS, Allerød (DK)

( * ) Notice: Subject to any disclaimer, the term of this patent is extended or adjusted under 35 U.S.C. 154(b) by 603 days.

This patent is subject to a terminal disclaimer.

(21) Appl. No.: 17/416,464

(22) PCT Filed: Dec. 16, 2019

(86) PCT No.: PCT/DK2019/050392
§ 371 (c)(1),
(2) Date: Jun. 18, 2021

(87) PCT Pub. No.: WO2020/125889
PCT Pub. Date: Jun. 25, 2020

(65) Prior Publication Data
US 2022/0065471 A1    Mar. 3, 2022

(30) Foreign Application Priority Data
Dec. 19, 2018 (DK) .................. 2018 70823

(51) Int. Cl.
*B01D 53/86* (2006.01)
*B01D 53/00* (2006.01)
(Continued)

(52) U.S. Cl.
CPC ............ *F24F 3/167* (2021.01); *B01D 53/007* (2013.01); *B01D 53/8668* (2013.01); *F24F 8/22* (2021.01);
(Continued)

(58) Field of Classification Search
CPC .......... F24F 3/167; F24F 8/22; B01D 53/007; B01D 53/8668; B01D 2251/104;
(Continued)

(56) References Cited

U.S. PATENT DOCUMENTS 5,626,860 A    5/1997  Cincotta et al.
6,159,421 A *  12/2000 Fujii ................. B01D 53/8668
                                                    422/4
(Continued)

FOREIGN PATENT DOCUMENTS

EP          093581 A1    7/1999
JP         H01266864 A  10/1989
WO     WO2007061401 A1   7/2017

OTHER PUBLICATIONS

International Search Report and Written Opinion Appl. No. PCT/DK2019/050392, mailed Mar. 17, 2020.
(Continued)

*Primary Examiner* — Frank M Lawrence, Jr.
(74) *Attorney, Agent, or Firm* — Fox Rothschild LLP

(57) ABSTRACT

The present invention relates to an air treatment method and a system (1a-1f) arranged for treating an air flow (3) to be entered into a semiconductor clean room. Said air flow (3) comprises at least one vapour phase compound, and wherein the air flow (3) is subjected to at least one first treatment process arranged for reducing the concentration of the at least one vapour phase compound in the treated air flow
(Continued)

below a predefined threshold, and wherein said first treatment process comprises subjecting the air flow to at least one photooxidation step.

17 Claims, 6 Drawing Sheets

(51) Int. Cl.
*F24F 3/16* (2021.01)
*F24F 3/167* (2021.01)
*F24F 8/22* (2021.01)

(52) U.S. Cl.
CPC .. *B01D 2251/104* (2013.01); *B01D 2255/802* (2013.01); *B01D 2257/206* (2013.01); *B01D 2257/40* (2013.01); *B01D 2257/708* (2013.01); *B01D 2257/93* (2013.01); *B01D 2259/4508* (2013.01); *B01D 2259/804* (2013.01)

(58) Field of Classification Search
CPC ........ B01D 2255/802; B01D 2257/206; B01D 2257/40; B01D 2257/708; B01D 2257/93; B01D 2259/4508; B01D 2259/804

USPC .................................. 422/24, 186.3; 96/224
See application file for complete search history.

(56) References Cited

U.S. PATENT DOCUMENTS

| | | | |
|---|---|---|---|
| 6,558,639 B1 | 5/2003 | Watanabe et al. | |
| 7,198,698 B1 | 4/2007 | Richards et al. | |
| 11,253,817 B2* | 2/2022 | Rosenørn | B01D 53/8668 |
| 2004/0040831 A1* | 3/2004 | Hong | B01D 53/8668 |
| | | | 422/186.3 |
| 2004/0251122 A1* | 12/2004 | Goswami | A61L 2/088 |
| | | | 422/186 |
| 2005/0129589 A1* | 6/2005 | Wei | B01J 21/063 |
| | | | 422/177 |
| 2015/0352242 A1* | 12/2015 | Ando | A61L 9/12 |
| | | | 422/122 |
| 2019/0063763 A1* | 2/2019 | Kleinberger | B01D 46/521 |

OTHER PUBLICATIONS

International Preliminary Report On Patentability(IPRP) Appl. No. PCT/DK2019/050392, mailed Mar. 4, 2021.

* cited by examiner

AIR TREATMENT METHOD AND A SYSTEM ARRANGED FOR TREATING AIR IN A CLEAN ROOM

This application is a 371 filing of International Patent Application PCT/DK2019/050392 filed Dec. 16, 2019, which claims priority to Danish application No. PA 2018 70823, filed Dec. 19, 2018, which are hereby incorporated by reference in their entirety.

TECHNICAL FIELD

The present invention relates to a method and a system for removing and/or reducing vapour phase compounds in a clean room.

BACKGROUND OF THE INVENTION

Semiconductors are essential components for most electronic devices, such as cellular phones and computer components. A semiconductor chip is a highly miniaturized, integrated electronic circuit consisting of thousands of components. Every semiconductor manufacturing process starts with raw wafers, thin discs made of silicon or gallium arsenide. Depending on the diameter of the wafer, up to a few hundred identical chips can be made on each wafer, building up the electronic circuits layer by layer in a wafer fab.

Generally wafer fabs are divided into front-end and back-end (where the circuits are completed and are being cut-up into their individual chips and wire-bonding is done). It is generally required to take the wafers through hundreds of discrete physical and chemical manufacturing steps in order to turn them into CPUs, memory chips, graphics processors and the like.

Front-end is where the wafer is processed from substrates into transistors and circuits layer by layer.

Electronic devices are not only becoming smaller, there is also an increasing demand for reducing power consumed by the circuits, and accordingly the semiconductors are physically becoming smaller and smaller. Today the semiconductor size has been reduced to the extend that a single particle/molecule is sufficient for short-cutting a circuit during the manufacturing process.

The particle contamination may be part of the materials of construction, created during fabrication, or introduced via air ducts and the like. Deposited particles can cause short circuits or open circuits either immediately or after the particles have interacted with solids, liquids or gases near them, and it is a well known problem in the semiconductor industry that airborne chemical contamination (ACC) present several processing problems during the manufacturing of semiconductors.

Thus, since a single particle/molecule is all it takes to e.g. ruin a CPU that might sell for more than US$ 500, there is a large demand from the manufacturing companies to minimize particle/molecule contamination in the production facilities.

In order to reduce the contamination risk, many of the manufacturing processes therefore occurs inside sealed chambers where robot arms move the wafers from one processing station to another. The machines themselves are furthermore housed within clean rooms, in order to keep the risk of aerial contamination low.

The most frequently used standard for clean rooms and clean zones is the International Organization for Standardization, ISO 14644-1 (2015), which establishes standard classes of air cleanliness for airborne particulate levels. Due to the sensitivity of the semiconductors to both particles and ACC contamination, the semiconductor manufacturing facilities must conform to the most rigorous standards for clean rooms, e.g. class 1, and the clean rooms are accordingly expensive to build and maintain.

In order to prevent dust and particles from entering the clean rooms, air is passed though either High Efficiency Particulate Air (HEPA) filters and/or Ultra Low Particulate Air (ULPA) filters that are designed to arrest very fine particles (down to about 0.3 µm and 0.1 µm respectively), but since HEPA- and ULPA filters cannot remove gas-phase compounds, chemical filters are used in combination with the HEPA- and/or ULPA filters for semiconductor cleans room facilities. These chemical filters are normally activated carbon filters, as e.g. disclosed in U.S. Pat. No. 5,626,820.

However, one main problem with activated carbon filters, is that over time, the gaseous compounds fill up the adsorption sites of the activated carbon. This will not only increase the pressure drop over the filter, but once the filter is saturated, the filter can no longer trap compounds. In fact, chemicals with a greater affinity for an adsorption site can displace those with lesser affinity, and the affinity of a given chemical for the sorbent is highly dependent on ambient conditions such as temperature and relative humidity. So, as conditions change, different chemicals may be released from the filter.

Since, a clean room for semiconductor manufacturing is highly sensitive for any kind of contaminant including gas-compounds, the carbon filters has to be maintained and/or changed at regular intervals. This is not only time consuming, but also extremely expensive.

Accordingly, filtration of gas-phase contaminants in the semiconductor industry continues to grow in urgency and application; and even though there presently exists a number of different technologies aiming at treating air in clean rooms, these solutions all require large amounts of energy, are very complicated to control and maintain, and are expensive and time-consuming to use.

EP0931581 discloses a purification apparatus for cleaning air in a sealed chamber placed inside a clean room. Said purification apparatus comprises a microparticle-producing section, and a decomposition section. In the microparticle-producing section the contaminants in the air (both organic and inorganic) are subjected to radiation e.g. via an UV-lamp, thereby forming a number of microparticles. Said microparticles may then settle on the surface of a photo-catalyst in the decomposition section, where the particles will decompose when the photocatalyst is activated by UV-light. However, such a two step process is time-consuming, and can only be used for small volumes of air.

Accordingly, there remains a demand for improved systems for the removal of vapour phase compounds from the entire air flow to a semiconductor clean room, whilst offering both a reduction in energy consumption in order to provide a substantial complete removal of vapour phase compounds from said air flow, and a decreased complexity with regard to initiation and control of the removal process.

SUMMARY OF THE INVENTION

It is therefore a first aspect of the present invention to provide an air flow treatment method and a system arranged for removing one or more vapour phase compounds from an air flow to a semiconductor clean room, in a fast and effective manner using much less energy for the removal process compared to the traditional air flow treatment systems and methods, It is a second aspect of the present invention to provide an air flow treatment system having a compact structure, and in which the pressure drop over the system is reduced, It is a third aspect of the present invention to provide an air flow treatment system which does not involve the use of chemical additives, e.g. oxidizing agents or scrubbing solutions, thereby reducing costs for the treatment process, eliminating the need for storage facilities for said chemical compounds and reducing the maintenance requirements, It is a fourth aspect of the present invention to provide an air flow treatment system arranged for removing both high and low concentrations of vapour phase compounds from an air flow at a relatively low temperatures, It is a fifth aspect of the present invention to provide an air flow treatment system for efficiently removing compounds without using scrubbing solutions, biofiltration, the use of acid resistant materials for construction, activated carbon filters and the like, and It is a sixth aspect of the present invention to provide an air flow treatment system that is inexpensive to manufacture and is simple and reliable to use.

The novel and unique features whereby these and further aspects are achieved according to the present invention is by providing an air treatment method arranged for treating an air flow to be entered into a semiconductor clean room, said air flow comprises at least one vapour phase compound, and wherein the air flow is subjected to at least one first treatment process arranged for reducing the concentration of the at least one vapour phase compound in the treated air flow below a predefined threshold, and wherein said first treatment process comprises subjecting the air flow to at least one photooxidation step.

Since a semiconductor clean room has to be an extremely controlled environment, i.e. have a low level of compounds such as dust, airborne microbes, aerosol particles, and chemical vapours, it is essential that all kinds of particle/vapour/compound are removed from air that is to be introduced to said clean room, irrespective of whether this is fresh/new air or air recycled from the semiconductor clean room.

Thus, the predefined threshold is set such that the concentration of the at least one vapour phase compound(s) is reduced to such an extend that the respective vapour phase compound(s) cannot negatively effect the manufacturing process of the semiconductors, i.e. the threshold meets the requirement of a class 1 clean room according to the International Organization for Standardization, ISO 14644-1 (2015). It is further preferred that it is the entire air flow to enter the clean room, which is treated using the air treatment method according to the invention.

In addition or as an alternative, the threshold for the at least one vapour phase compound(s) is set to be about 500 ppt, such as about 300 ppt, and even more preferred about 100 ppt, however said threshold may vary depending on the compound in question. It is however preferred that the at least one vapour phase compound(s) cannot be detected in the air flow that enters into the semiconductor clean room, i.e. the vapour phase compound(s) are in effect completely removed from the air stream. The techniques for detecting the vapour phase compound(s) may be any conventional highly sensitive detection technique, e.g. gas chromatography, a mass spectrometry technology, fourier-transform infrared spectroscopy (FTIR) and/or Chemical ionization mass spectrometry.

Thereby is obtained a process which ensures that any vapour phase components that could have had a detrimental effect on one or more steps of the semiconductor process will not be entered into the clean room, together with the air flow that is subjected to the treatment method.

DETAILED DESCRIPTION OF SPECIFIC EMBODIMENTS

Photooxidation is a well known destruction process wherein the at least one vapour phase compound (e.g. hydrocarbons, fluorocarbons, etc.) are converted into carbon dioxide and water i.e. the hydrocarbons may be converted into compounds that either safely can be submitted into the semiconductor clean room (e.g. carbon dioxide) or otherwise easily be separated from the air flow (e.g. water) in one or more second treatment steps, e.g. condensation steps.

It is however preferred, that if the decomposition of the at least one vapour phase component results in decomposition products (by-products) other than water and carbon dioxide, the air flow is subjected to several consecutively arranged photooxidation steps, such that decomposition products generated in a first photooxidation steps is further decomposed in a subsequent photooxidation steps, etc., until the only decomposition products remaining is carbon dioxide and water. Carbon dioxide can safely be submitted into the semiconductor clean room, and if the water content in the air flow is to high to meet the clean room requirements (e.g. class 1 of ISO 14644-1 (2015)), the water can easily be removed from the air flow, in a second treatment step, e.g. condensation, before the air flow enters the semi-conductor clean room.

A person skilled in the art will further understand that it also is possible to remove other decomposition products besides water and/or particulates matter in the one or more second treatment steps, as this may reduce the requirement for multiple photooxidation step. The choice of second treatment step(s) and number of second treatment steps, depends on the decomposition compounds provided after the at least one vapour phase compound is decomposed in the photooxidation step, and/or if particulate matter are to be removed. Such second treatment step(s) will be readily available to the person skilled in the art.

The inventors of the present invention have however found that in an advantageous embodiment the first treatment process further comprising passing the air flow through at least one catalytic zone.

The catalytic zone may be placed before and/or after the photooxidation zone. However, said catalytic zone is preferably a separate zone, independent of the photooxidation process, and it is further preferred that the catalytic zone and/or air treatment method according to the invention, does not comprise a photocatalyst.

If the catalytic zone is placed before the photooxidation zone, the method according to the invention is not only capable of completely removing vapour phase compounds from an air flow to be entered into a semiconductor clean room, but the vapour phase compounds/components that may have a negative impact on the photooxidation process, can be removed in the catalytic zone(s), thereby improving the efficiency of the photooxidation process.

Such an embodiment is accordingly unique in that the air flow that comprises at least one vapour phase compound is first passed through at least one catalytic zone, arranged for at least providing a reduction in the concentration of said first compound (e.g. by converting/decomposing the at least one first vapour phase compound to one or more other compounds, e.g. hydrocarbons) before the thereby obtained gas stream is subjected. to at least one photooxidation process wherein the remaining content of the at least one vapour phase compound and/or the one or more other compounds e.g. hydrocarbons, is removed/decomposed.

Thus, in the catalytic zone the at least one first vapour phase compound may be either partly or completely converted/decomposed into one or more hydrocarbons e.g. a VOC, that easily can be removed/decomposed in the subsequent photooxidation step; and/or the concentration of the least one vapour phase compound may be reduced, and the remaining concentration of said vapour phase compound(s) is completely removed/decomposed in the photooxidation step. The specific decomposition route will depend on the respective vapour phase compound(s).

Accordingly, the "pre-treatment" of the air flow in the catalytic zone(s), where the concentration of the least one first vapour phase compound is reduced/removed, ensures that the subsequent photooxidation process works optimally, and that the hydrocarbons can be more effectively removed in the photooxidation step(s). In a preferred embodiment the concentration of the at least one first vapour phase compound is preferably significantly reduced and even more preferred substantially removed, e.g. it is converted into one or more hydrocarbons in the catalytic zone(s).

The method according to the invention thereby provides a very simplified air treatment method for completely removing at least one vapour phase compound from an air flow to be passed into a semiconductor clean room.

If the catalytic zone is placed. after the photooxidation zone, said catalytic zone may be arranged for further decomposing the at least one vapour phase compound and/or decomposing other products generated in the photooxidation step e.g. ozone generated in the photooxidation step.

The catalytic zone used in the method according to the invention may be arranged for reducing/converting/decomposing the at least one vapour phase compound to one or more other compounds (hydrocarbons) that preferably may be removed in one or more subsequent photooxidation process. Examples of the hydrocarbons that easily be removed by the photooxidation step are organic acids, alcohols, and aldehydes, and primary, secondary and tertiary amines, as well as VOCs and BTEX.

As discussed earlier, certain by-products, originating from the at least one first vapour phase component, may be present in the air flow and which components can neither be removed in the catalytic zone and/or photooxidation step, nor can they be introduced into the semiconductor clean room. Such by-products may be removed in the one or more second treatment process, as disclosed earlier. Said second treatment step(s) are preferably conducted after the step in which the compound to be removed has been generated, e.g. said second treatment step(s) may be placed between one or more catalytic zone(s) and/or one or more photooxidation step(s), and/or just before the air flow are to be entered into the clean room. The choice of second treatment process, number of second treatment processes, and their placement, will e.g. depend on the by-product in question. Said second treatment process may e.g. be performed in adsorbing units, scrubbing units etc.

Furthermore, in order to prevent other kinds of contamination from being entered into the semiconductor clean room, the second treatment process may as an alternative or in addition to the second treatment step above be passed trough one or more second treatment processes/steps arranged for removing e.g. particle contamination etc. Said second treatment steps may be located before and/or after the photooxidation step (seen in the flow direction), optionally before and/or after the catalytic zone. In these situations the second treatment process/step may e.g. be electrostatic precipitation, mechanical filtration (HEPA, ULPA etc), non-thermal plasma processes etc. or other conventional means for removing particular matters from an air flow.

It should in this respect noted that during the semiconductor manufacturing process a number of vapour phase components are either generated. and/or released. into the air in the clean room, and it. is essential that. said components are effectively removed from the air before. It is reintroduced/recycled into the semiconductor clean room. It is therefore relevant to constantly clean/treat air originating from the clean room, and recycle the cleaned/treated air back into the clean room. Thus, the air to be treated in the method according to the invention, may either be new/fresh air from the surroundings, however, in a preferred embodiment said air is originating from a semiconductor clean room.

In order to ensure that the concentration of the at least one vapour phase component in the air flow is reduced below a predefined threshold, before said air flow is introduced into the semiconductor clean room, the air flow may pass though more than one catalytic zone and/or more than one photooxidation step, in order to ensure that the concentration of the vapour phase compounds which could be destructive for the semiconductor manufacturing process, is not introduced into the semiconductor clean room.

In one embodiment the air treatment method comprises passing the air flow though more than one catalytic zone before entering the photooxidation step, and wherein each of said more than one catalytic zone is arranged for reducing the concentration of the same/identical vapour phase compound and/or one or more different vapour phase compounds.

Thus, if the concentration of the at least one vapour phase compound is not reduced sufficiently in a first catalytic zone, i.e. the remaining concentration of said compound can either not be completely removed in the photooxidation process or said compound will still influence the photooxidation process negatively, the concentration of the vapour phase compound can be further reduced in a subsequent, e.g. identical, catalytic zone, and so on, until the concentration of the at least one vapour phase compound is reduced to an acceptable level, i.e. below a predefined threshold in which the least one vapour phase compound is either completely removed, i.e. converted into one or more other compounds such as hydrocarbons which e.g. can be removed in the photooxidation step(s), and/or the concentration of said compound is so low that it can be removed in the subsequent photooxidation step(s).

Alternatively, or in addition, if the air flow comprises different kinds of vapour phase compounds, said air flow may pass though a number of different catalytic zones, each arranged for reducing the concentration of an individual vapour phase compound.

In an alternative embodiment the air flow is first passed through one or more photooxidation steps, and thereafter though one or more catalytic zone(s), and in a still further embodiment the catalytic zone and photooxidation steps are arranged alternating, e.g. first a photooxidation step, then a catalytic zone, and then a photooxidation step. Further steps/zones may be included and the zones/steps may be arranged in any desirable order, the only requirement being that the concentration of the vapour phase compounds which could be destructive for the semiconductor manufacturing process, is removed from the air flow before said air flow is introduced into the semiconductor clean room.

Accordingly, the air flow treatment system can be constructed to meet different demands, depending on the compounds/compounds in the air flow such that several different vapour phase compounds can be removed by passing the air flow though identical and/or different, and subsequently arranged, catalytic zones and/or photooxidation steps, and wherein each zone and/or step reduces the concentration of one or more specific compounds.

Several catalytic zones may in one embodiment be combined into a single zone, i.e. said catalytic zone comprises several catalysts arranged for removing different vapour phase compounds.

The number of catalytic zones/photooxidation steps the air flow passed through may vary depending on the relevant air flow and the efficiency of said zones/steps, but there may be e.g. two, three, four or even higher numbers of catalytic zones if required, and two, three, four or even higher numbers of photooxidation steps. The only requirement being that the concentration of the at least one vapour phase compound in the air flow after completion of the first treatment, is so low that said air flow can be introduced into the semiconductor clean room without compromising the semiconductor clean room, i.e. the criteria's for the semiconductor clean room are meet.

The at least one vapour phase compound may either be part of a new air flow to be introduced, or be compounds created during the semiconductor manufacturing in the clean room, e.g. from by evaporating liquids. In a preferred embodiment the at least one vapour phase compound is an organic compound selected from VOC's, amines, silanes; phospates; siloxanes; organometallic compounds, halocarbons, and perfluorinated compounds. As the air flow is intended for being introduced into a semiconductor clean room, especially organic compound known to cause problems in a semiconductor clean room, such as diphenylamine, tricresyl phosphate, trimethyl phosphate, vinyltris(methylethylketoxime)-silane; and octamethyl-cyclotetra-siloxane are relevant, and the method according to the invention is unique in that it can be arranged to remove these compounds from an air flow completely, i.e. below a predefined threshold. Furthermore, hydrogen and/or ammonia may be used in the semiconductor manufacturing processes, and ozone may be used in the semiconductor washing process, thus is it preferred if the method and system according to the invention is also capable of removing said compounds from the air flow before it is re-cycled into the semiconductor clean room.

A person skilled in the art will understand that an air flow comprising an organic amine as the vapour phase compound may require a different catalytic zone than an air flow comprising an organometallic compound as the vapour phase compound, however the present invention can easily be adjusted to meet the different requirements. Some vapour phase compounds may be removed by the same catalytic zone, otherwise additional and/or different catalytic zones may be provides if desired, in order to ensure that the vapour phase compounds is complete removed.

If the air flow comprises a vapour phase compound in the form o of an amine, e.g. diphenylamine, dimethyl-N-ethylamine, dimethyl-N-iospropylamine, dimethyl-N-propylamine and/or triethyl amine; ammonium; nitrosamines and the like, the catalytic zone is preferably arranged before the photooxidation step, and is arranged to facilitate reactions involving atmospheric oxygen or oxygen present in the air flow where the oxygen is the oxidant. Initial tests have shown that, by bringing e.g. an amine-containing air flow into contact with the surface of the catalysts in the catalytic zone, the amine will be subjected to an oxidative decomposition, e.g. by directly oxidising the amine to organic acids, whereby the amine effectively will be removed from the air flow. The resulting organic compounds, e.g. organic acids etc. will then be removed in the subsequent photooxidation step together with the remaining hydrocarbons.

The inventors of the present invention have surprisingly discovered that when the at least one vapour phase compound is one or more amine(s), a combination of a deNO$_x$-catalyst and an oxidation catalyst provides a unique and synergistic effect in which the amines can be substantially completely removed from said air flow, an effect which is not observed when the air flow only passes over one of said catalysts.

Thus, in a preferred embodiment for removing organic amines from the air flow the catalytic zone may comprise a combination of said two catalysts, i.e. an deNO$_x$ catalyst and an oxidation catalyst, thereby ensuring a substantial complete removal of the amines from the respective air flow. The inventors of the present invention has shown that the amines can be completely removed from an air flow containing amines by means of the method according to the present invention when using a combination of a deNO$_x$-catalyst and an oxidation catalyst. Depending on the initial concentration of the amines in the air flow, said air flow may pass though several catalytic zones in order to ensure that the amines is completely removed.

The use of the catalytic zone with at least a deNO$_x$ catalyst and an oxidation catalyst further has the advantage that hydrocarbons present in the air flow, also will be oxidised, and accordingly at least to some extent be removed from said air flow. The system thereby provides a very simplified methods to ensure that the air flow is completely free from vapour phase compounds.

The deNO$_x$-catalyst is preferably a Selective Catalytic Reduction (SCR) catalyst, which is designed to convert NO$_x$ into nitrogen and water by using reaction reducing agents, such as ammonia (NH$_3$) or urea. It should be noted that both the oxidation catalysts, that e.g. allows CO to be converted into carbon dioxide, and the SCR-catalyst are well-known and widely used technologies, e.g. for treating air flow-streams from combustion engines. However a combination of said catalysts has not been described or suggested for removing amines and/or hydrocarbons from an air flow to be entered into an semiconductor clean room.

Furthermore, oxidative decomposition of the organic amines also provides a continuing purification of the catalyst. The amines are accordingly substantially completely removed from the air flows without significantly adding to the level of contamination, which constitutes a distinct advantage when comparing with the used prior art technologies for removing amines and/or hydrocarbons e.g. VOCs from air flows.

In a similar way as described above for one or more amines the at least one catalytic zone may be specifically arranged for reducing the concentration/substantially completely removing at one or more of the other relevant vapour phase compound including but not limited to compounds known to cause problems in a semiconductor clean room, such as tricresyl phosphate, trimethyl phosphate, vinyltris (methylethylketoxime)-silane; and octamethyl-cyclotetra-siloxane.

As other suitable catalysts relevant in this connection can be mentioned CARULITE® 200 catalyst (arranged for converting ozone into oxygen) obtainable from Carus Corporation; Purelyst MD-101® (arranged for decomposing VOCs), obtainable from PureSphere Co., Ltd. and NHC catalysts (arranged for decomposing $NH_3$ and removing ozone), obtainable from Nikki-Universal Co., Ltd.

The present invention also relates to an air flow treatment system for a semiconductor clean room, said system being arranged for performing the method described above. Said system comprises at least one photooxidation zone arranged for treating an air flow comprising at least one vapour phase component, and wherein the air treatment system is arranged such that the concentration of the at least one vapour phase compound in said air flow, is reduced below a predefined threshold.

If the decomposition of the at least one vapour phase component results in decomposition products (by-products) other than water and carbon dioxide, the air flow may further be subjected to several consecutively arranged photooxidation zones, such that decomposition products generated in a first photooxidation zone is further decomposed in a subsequent photooxidation zone, etc., until the only decomposition products remaining is carbon dioxide and water. Carbon dioxide can safely be submitted into the semiconductor clean room, and water can easily be removed from the air flow, in a second treatment step, (in a second treatment zone), e.g. a condensation zone, before the air flow enters the semi-conductor clean room.

A person skilled in the art will further understand that it also is possible to remove other decomposition products besides water in the second treatment zone, as this may reduce the requirement for multiple photooxidation step. The choice of second treatment zone(s), depends on the decomposition compounds provided after the at least one vapour phase compound is decomposed in the photooxidation step. Such treatment zone(s) will be readily available to the person skilled in the art.

The inventors of the present invention have however found that in an advantageous embodiment the treatment system comprises:
    at least one catalytic zone, and
    at least one photooxidation zone.

The order and number of photooxidation zones and catalytic zones, depending on the compound to be removed form the air flow. In one embodiment the system comprises at least one photooxidation zone is arranged after the at least one catalytic zone, in another at least one catalytic zone is arranged after the at least one photooxidation zone, and in a still further embodiment the catalytic zone and photooxidation zones are arranged alternating, e.g. first a photooxidation step, then a catalytic zone, and then a photooxidation step etc. Further steps/zones may be included and the zones/steps may be arranged in any desirable order, the only requirement being that the concentration of the vapour phase compounds which could be destructive for the semiconductor manufacturing process, is removed from the air flow before said air flow is introduced into the semiconductor clean room.

In one preferred embodiment the air flow is first passed through a catalytic zone and then being subjected to the photooxidation step in the photooxidation zone, and wherein the air flow thereafter will be completely free from the at least one vapour phase compound, meaning that it can be safely emitted into the semiconductor clean room.

The catalytic zone(s)/unit(s) may be individually arranged in order to remove different kind of vapour phase compounds, for instance, when the at least one first vapour phase compound contains amines, the catalytic unit preferably comprises a $deNO_x$-catalyst and an oxidation catalyst.

The $deNO_x$-catalyst is preferably a SCR-catalyst, wherein vanadium pentoxide ($V_2O_5$) the active compound, is placed on a titanium dioxide ($TiO_2$) carrier system. The oxidation catalyst can be a conventional CO oxidation catalyst.

Both the oxidation catalyst and the SCR catalyst are preferably coated on a honeycomb or monolithic support structure. The monolithic structure will preferably have a large number of parallel channels in order to provide a large catalyst surface area while at the same time ensure a low pressure drop over said catalytic unit.

The catalyst unit may in one embodiment be arranged as separate catalytic units/layers, e.g. one, two or three SCR catalyst layers and one, two or three oxidation catalyst layers, however in order to reduce the size of the catalytic unit and still achieve a minimal pressure drop penalty, a combination of the two catalytic functionalities in a single catalyst is preferred, e.g. by providing a combined catalyst having the desired catalytic activity.

In order to minimize the oxidation of $NH_3$/tertiary amines to $NO_x$ as well as the oxidation of other undesirable compounds such as NO to $NO_2$ and $SO_2$ to $SO_3$ (if such compounds are present in the air flow to be treated) it is preferred to dope the SCR catalyst with a noble metal, preferably palladium, it is however preferred to keep the noble metal content in the SCR catalyst or the combined catalyst to a minimum, since the noble metal may make the catalyst ineffective.

One example of a catalyst material for use in the system according to the present invention for removing amines is the DNX® GTC-802 catalyst obtainable from Haldor Topsøe, Denmark. Said catalyst system is described in WO2016150465 A1. Furthermore, in said catalyst the noble metal for the CO oxidation reaction to the standard SCR titanium carrier is added in such a way that the concentration and the distribution of noble metal (i.e. palladium, Pd, in this case) are controlled to a very uniform level.

Emphasis is made that above-mentioned catalysts, including the nature, structure and/or composition, should not be seen as an exhaustive list. Other alternative catalysts for removing amines, e.g. an ammonia-slip catalyst in front of a VOC oxidation-catalyst can also be used within the scope of the present invention.

As already disclosed earlier in this application, other suitable catalysts are also contemplated within the scope of the invention.

Irrespectively of the individual arrangement of the catalytic zone(s) and/or catalytic unit(s), the inventors of the present invention has found that said catalytic zone(s)/unit(s) preferably is operated at the same temperature as the air in the clean room, e.g. between 15-25° C., preferably around 20-22° C. whereby the air flow neither has to be heated nor cooled, thereby providing a highly energy effective system and method.

However, in some embodiments, when the catalytic zone/unit is placed after the photooxidation zone, it may be preferred that the catalytic zone is operated at a temperature between 80-225° C., preferably between 125 ° C. and 200 ° C., whereby a very effective removal of the at least one vapour phase compound e.g. amines, is provided. If the temperature is raised to temperature above 225 ° C., such as about 250° C., the efficiency of the catalytic zone will be significantly reduced, which again will negatively impair the subsequent photooxidation process.

In a preferred embodiment the system according to the invention comprises a temperature conditioning zone arranged for heating the air flow to the optimal temperature of the catalytic zone. Said condition zone is accordingly placed before the catalytic zone. Said temperature conditioning zone may e.g. heat the air flow to a temperature of between 80° C. and 225° C. The air flow may e.g. be heated in a recuperative heat exchanger followed by additional input from a burner if needed, before it is passed through the catalytic zone(s). However the heating of the air flow can be achieved in any conventional way. It is not preferred to heat the air flow above 250° C., as this may negatively influence the energy efficiency of the catalytic zone.

It must be stressed that even though the above catalytic material are known, they are all arranged for removing compounds, e.g. $NO_x$ and CO from combustion engines, and accordingly to operate at temperatures much higher than the temperature range used in the present invention for the catalytic zone. For instance, a standard regenerative catalytic oxidizer (RCO) operates at a temperature between 400-500° C., thus the system according to the invention provides a very simple and effective means for reducing the energy needed to remove at least one vapour phase compound, e.g. organic amines and/or organic siloxanes from an air flow.

In situations where the temperature of the air flow exiting the catalytic zone is relatively high, it is desired to cool the air flow before said air flow is introduced into the semiconductor clean room. It is in this respect preferred to deliver the heat excess to a heat exchanger e.g. in a heat exchange zone before the second treated gas stream is delivered to said semiconductor clean room.

The air flow treatment system according to the invention may comprise more than one catalytic zones placed before the photooxidation zone. In one embodiment said catalytic zones are substantially identical and is arranged for removing the same vapour phase compound. This embodiment has the advantage, that if the concentration of the at least one vapour phase compound is not reduced sufficiently in a first catalytic zone, i.e. the remaining concentration of said compound will still influence the photooxidation process negatively, the concentration of the vapour phase compound can be further reduced in a subsequent catalytic zone, and so on, until the concentration of the at least one first vapour phase compound is reduced to an acceptable level, i.e. to an extend where the remaining concentration of said compound can be removed in the photooxidation zone, or below the threshold of said compound.

Alternatively, if the air flow comprises different kinds of vapour phase compounds, the air flow treatment system may also comprises more than one catalytic zone, and wherein each catalytic zone is arranged for reducing the concentration of an individual vapour phase compound, i.e. at least some of the the catalytic zones will be different from each other. Accordingly, the air flow treatment system can be constructed to meet different demands, depending on the compounds/compounds in the air flow such that several different vapour phase compounds can be removed by passing the air flow though different, and subsequently arranged, catalytic zones, and wherein each catalytic zone removes one or more specific compounds, thereby providing a first treated gas stream which is then subjected to the photooxidation process. This embodiment has the further advantage that if the air flow to be treated contains certain vapour phase compounds that may negatively influence the treatment in subsequent catalytic zones, said compounds may be removed in an earlier catalytic zone, thereby optimising the treatment process. The catalytic zone may however also be combined into a single zone, i.e. the catalytic zone comprises several catalyst arranged for removing different vapour phase compounds.

The number of possible catalytic zone may vary depending on the relevant air flow and the efficiency of said catalytic zones, but there may be e.g. two, three, four or even higher numbers of catalytic zones if required.

The air flow treatment system according to the invention may also comprise both substantial identical and different catalytic zones, e.g. two catalytic zones arranged for removing a the same first vapour phase compound e.g. an amine, and e.g. two catalytic zones which is each arranged for removing two further vapour phase compounds.

The catalytic zone/unit is preferably arranged. for using oxygen present in the air flow as an oxidant, however if the amount of oxygen present in the air flow is not sufficient for providing the desired oxidation of the vapour phase compounds, VOCs, and the like, additional oxygen may be added to the catalytic unit e.g. in a secondary air stream.

As an alternative to oxygen and/or air, ozone may be added/injected to the catalytic zone/unit. Ozone has the advantage that it has a high oxidation potential (2.07V), making it possible to shorten the retention time in the catalytic zone and/or use smaller catalysts in said zone. In other words the investment cost may be reduced considerably if ozone is used as an additional oxidation agent.

Said secondary air/oxygen stream may alternatively be provided in a second gas line connected to an air flow line/pipe just prior to the catalytic zone.

Even though a number of different hydrocarbon removing techniques are known, and could be used for further treating the first treated gas stream it is preferred to use an $UV-O_3$ photooxidation process in the method and system according to the present invention, i.e. the first treated are stream is subjected to a combination of UV and ozone ($O_3$), preferably simultaneously, The advantages of photooxidation are numerous. First of all, photooxidation is a destruction process wherein the resultant products are carbon dioxide, water, and inert salts. Thus, the air flow, which is originating from the photooxidation step, may easily be treated such that said air flow can be directly and safely introduced into the semiconductor clean room.

In combination with natural oxygen, UV light creates highly reactive radicals and ozone, which oxidises the hydrocarbons e.g. VOCs (including compounds such as odours, solvents etc.) and eliminates them in the oxidation process.

Secondly, UV-light is an energy-saving and environmentally, friendly solution, and ultraviolet radiation is powerful enough to break many covalent bonds. Alone it can degrade PCBs, dioxins, polyaromatic compounds, and BTEXs.

Finally, ozone, which is used as an oxidant in the process, is a potent oxidant, and since ozone can be generated on site (using UV-lamps) and used immediately, no storage area is required for the oxidant. It is accordingly preferred that the first treated air stream passes a photooxidation zone wherein one or more UV-lamps is installed. Even though ozone may be produced in an ozone generator and added directly to the photooxidation, it is preferred that at least some of the UV-lamps are arranged for operating in an UV-spectrum which produces ozone, i.e. in a UV-spectrum below 242 nm. It is furthermore preferred that at least some of the UV-lamps operate in an UV-spectrum arranged for generating hydroxyl (OH) radicals in the presence of $O_2$ and $H_2O$, i.e. in an UV-spectrum below 305 nm.

In order to ensure that the UV-lamps arranged for generating OH-radicals operate at highest efficiency, a water vapour delivery system may be installed in said photooxidation zone to increase the relative humidity and/or absolute water content of the first treated gas stream or the combined gas stream to at least above 90%. Alternatively the relative humidity of the first treated gas stream or the combined gas stream may be raised to at least above 90% before said gas stream enters the photooxidation zone.

In an alternative embodiment at least some of the UV-lamps in the photooxidation zone, preferably all UV-lamps, are excimer lamps, and wherein the photooxidation zone is arranged such that at least 90% of the first treated air stream will be exposed to photons emitted from the excimer lamps.

Excimer lamps are quasi-monochromatic light sources available over a wide range of wavelengths in the ultraviolet (UV) and vacuum ultraviolet (VUV) spectral regions. The operation of excimer lamps is based on the formation of excited dimers (excimers). These excimer formations are unstable and will disintegrate within nanoseconds, giving up their excitation (binding) energy in the form of photons (radiation) at a characteristic wavelength.

The generated radiation (emitted photons in the UV and VUV range) will upon contact with e.g. organic compounds in the air break down said components through the process of photolysis, which is highly effective at removing different organic compounds. A further advantage of the emitted radiation is that it may cause oxidants, such as ozone and/or excited oxygen species, e.g., •OH, $O^1D$, $O^3P$ to be generated from oxygen present in the air, which also will proceed to oxidise organic components present in the air.

In a preferred embodiment according to the present invention, the excimers are produced using the rare gases, i.e. $He_2$, $Ne_2$, $Ar_2$, $Kr_2$ and $Xe_2$, or the rare gas halides (e.g. ArF, KrF, XeCL and XeF). However, halogenes and mercury halogen mixtures (e.g. HgCl, HGBr og HgI) are also contemplated within the scope of the present invention.

The excimers may be produced according to the present invention, by silent electrical discharge where the relevant gas for producing the excimers, e.g. xenon, are placed in a gap between two concentric quarts tubes. This technology is are well known and will not be discussed in further details in this application, however one preferred excimer lamp for use in the present invention may be a xenon lamp obtained from USHIO America Inc.

The wavelength of the emitted photons depends on the gas used to provide the excimer. This means that different wavelengths of the photons can be obtained by selecting an excimer lamps with the gas of interest. For instance, a xenon excimer lamp will generate radiation with a wavelength of 172 nm, whereas an argon excimer lamp will provide a wavelength of 129 nm and a krypton fluoride excimer lamp will provide a wavelength of 222 nm. A complete list of the relevant wavelength can be found in the literature.

The use of excimer lamps offer a number of advantages, high intensity at a defined wavelength, no-self absorption, and flexibility in the construction of the air treatment system according to the present invention.

Since only a single gas is used in each excimer lamp, the radiation output by the excimer lamps is restricted to a narrow UV wavelength range. This allows a perfect match with the absorption spectrum of the compounds that are to be removed from the first treated air flow, i.e. the excimer lamps in the air treatment system according to the invention may be selected in order to match the absorption spectrum of the compounds in the first treated air stream.

Furthermore, excimer lamps only generates little heat, making them highly suitable for an air flow to be introduced into a semiconductor clean room, as cooling may not be required before the treated air is submitted into said clean room.

In addition, excimer lamps have a long lifetime because the electrodes are not in direct contact with the discharge gases and will thus avoid any corrosion during the discharge process and no contamination of the excimer gas, as is often the situation in conventional UV-mercury lamps leading to a short operating lifetime. Finally, non-toxic materials are used in the excimer lamps and thus inherently, there is no environmental problem.

It is preferred that excimer lamps used in the present invention emits photons having a wavelength in the range between 126 nm and 240 nm, since photon emitted in this range not only will ensure a substantially complete removal of components, but also that the generation of further compounds, such as NOx, is prevented.

In one advantageous embodiment, the excimer lamps emits a wavelength of about 172 nm. The inventors of the present invention have shown that this wavelength in a very energy efficient way is capable of removing substantially all organic compounds e.g. VOC's by means of photolysis. Furthermore said wavelength will also produce the oxidant ozone, that will proceed to oxidise organic contaminants present in the air.

However, other wavelengths is also preferred within the scope of the present invention. As an example can be mentioned that wavelength around 185 nm will generate ozone, and wavelengths around 222 nm has proven to be effective in destroying double bonds e.g. C=C and C=O. KrI excimer lamps will provide photons with a wavelength of 185 nm and KrCl will emit photos having a radiation peak at 222 nm. A radiation peak around 222 nm will, if humidity is present in air to be treated, also provide a photo-induced production of hydrogen peroxide ($H_2O_2$). Since hydrogen peroxide is a strong oxidation agent (as is ozone) this will further ensure an effective removal of organic pollutants.

Irrespectively of whether the UV-lamps are conventional UV-lamps and/or excimer lamps the photooxidation process neither requires chemicals nor high temperatures, and a variety of vapour phase components can be effectively and completely removed from the air flow to treated.

In a preferred embodiment according to the present invention the air flow treatment system according to the invention is arranged for being retrofitted into existing semiconductor clean room filtration systems, thereby reducing cost for expensive installation of new equipment.

The invention will be explained in greater detail below, describing only exemplary embodiments of the air flow treatment system and method with reference to the drawing, in which

DETAILED DESCRIPTION OF THE DRAWINGS

The invention will be described below with the assumption that the air flow is collected from a semiconductor clean room comprising at least one vapour phase component, e.g. diphenylamine, and that said air flow has to be treated before it is reintroduced into said clean room. However, the origin of the air flow is immaterial to the method and system of the present invention.

Figure 1:
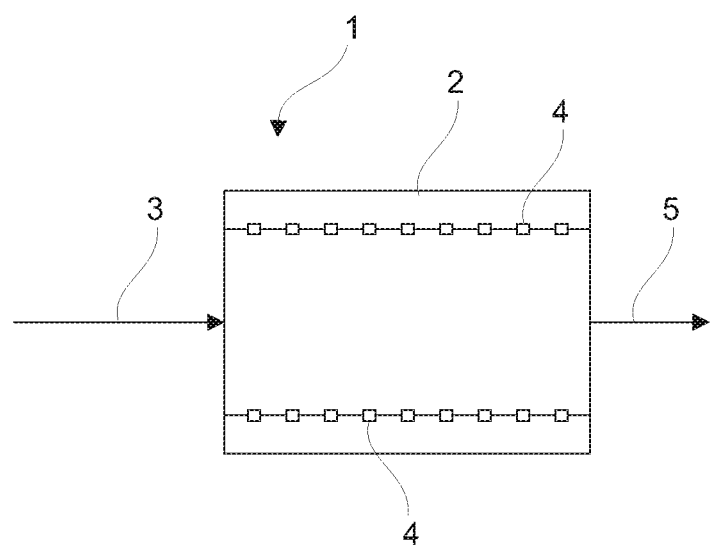
FIG. 1 shows schematically a first embodiment of an air flow treatment system according to the present invention.

FIG. 1 shows a first simplified embodiment of a air flow treatment system 1a according to the invention. Said system consist of a single photooxidation zone 2. The air flow to be treated 3 comprises one or more vapour phase components and when said air flow is passed through the photooxidation zone 2, the air flow will subjected to a photooxidation step, in which the at least one vapour phase compound are converted/decomposed into carbon dioxide and water, i.e. the photooxidation zone 2 is arranged such that the concentration of the vapour phase compound is reduced below a predefined threshold.

In the photooxidation zone a number of UV-lamps 4 are installed. Said lamps may e.g. be arranged for either operating in an UV-spectrum which produces ozone, and/or arranged for producing OH-radicals. However said UV-lamps 4 may alternatively (or in addition) be excimer lamps arranged for emitting a wavelength of about 172 nm, as said wavelength is capable of removing substantially all organic compounds e.g. VOC's by means of photolysis. Furthermore said wavelength will also produce the oxidant ozone, that will proceed to oxidise organic contaminants present in the air.

Thus, in this first embodiment the photooxidation zone 2 eliminate the at least one vapour phase compound from the treated air flow 5, such that the treated air flow 5 safely can be introduced into the semiconductor clean room.

Figure 2:
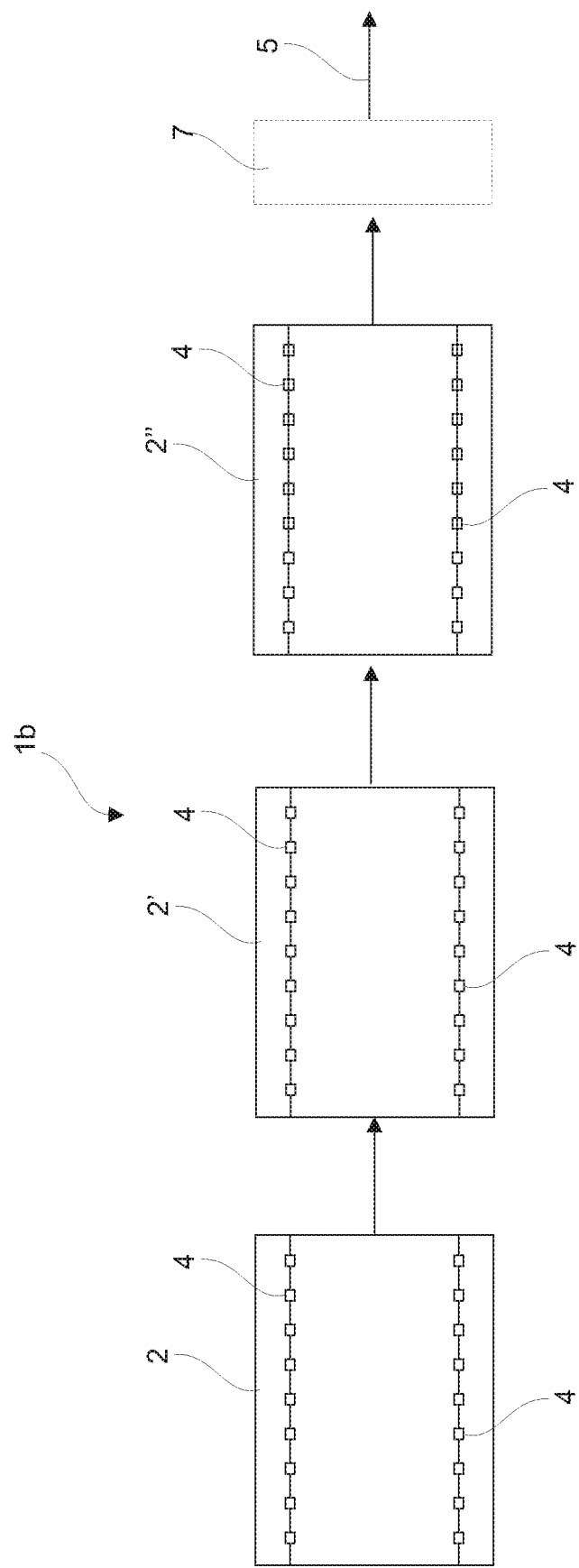
FIG. 2 shows schematically a second embodiment of an air flow treatment system according to the present invention.

However, if the decomposition of the at least one vapour phase component in the photooxidation zone results in decomposition products (by-products) other than water and carbon dioxide, the air flow 3 may in a second embodiment 1b, shown in FIG. 2 be subjected to several consecutively arranged photooxidation steps 2, 2', 2'', such that decomposition products generated in a first photooxidation 2 zone is further decomposed in a subsequent photooxidation 2' zone, etc., until the only decomposition products remaining is carbon dioxide and water.

It should be noted that carbon dioxide safely can be submitted into the semiconductor clean room, and if the humidity in the air exceeds the thresholds for a semiconductor clean room, the water can easily be removed from the air flow, e.g. in an second treatment step/zone 7 e.g. a condensation zone, located after the last photooxidation zone 2'', i.e. immediately before the treated air flow 5 enters the semi-conductor clean room. Such an optionally second treatment zone is show in dotted line in FIG. 2.

Figure 3:
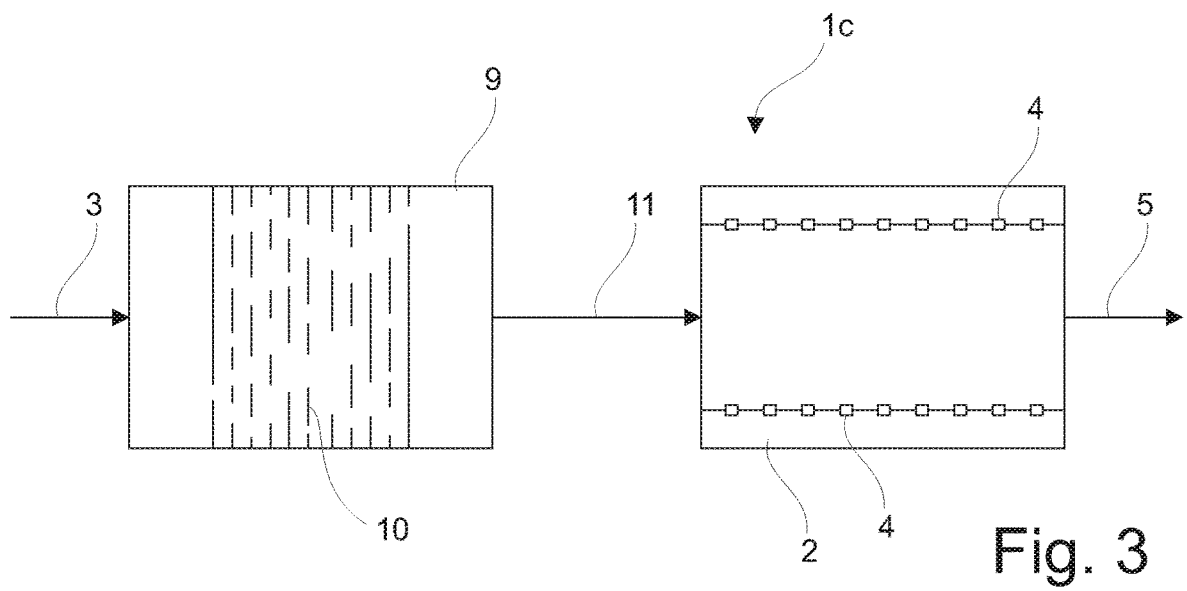
FIG. 3 shows schematically a third embodiment of an air flow treatment system according to the present invention.

In a third embodiment 1c shown in FIG. 3 the system according to the invention further comprises a catalytic zone 9 in which the air flow 3 first is passed over a catalytic unit 10 comprising a deNO$_x$-catalyst and an oxidation catalyst. The air flow 11 exiting the catalytic zone 9 is then passed though a photooxidation zone 2, arranged after the catalytic zone 9, and in which the first treated air stream 11 is subjected to a photooxidation step, as already discussed in relation to FIGS. 1 and 2. The treated air flow 5 from the photooxidation zone 2, can then be passed into the clean room.

The system and method shown in FIG. 3 is unique in that when the air flow 3 is passed over the catalytic zone 9, any amines present in said air flow is substantially completely removed. Thus, in the catalytic zone 9 the amine may be either partly or completely converted/decomposed into one or more hydrocarbons e.g. a VOC, that easily can be removed/decomposed in the subsequent photooxidation zone 2. Alternatively, the concentration of amine may be reduced, and the remaining concentration of said amine is completely removed/decomposed in the photooxidation zone 2.

The catalytic zone is operated at temperatures between 100-225° C., preferably between 125° C. and 200° C. whereby a very effective amine removal is provided. If the temperature is raised above 250° C. the efficiency of the catalytic zone 9 will be significantly reduced, with the risk that amines are left in the air flow 11.

Since the catalyst unit 10 comprises a deNO$_x$-catalyst and an oxidation catalyst a significant portion of the VOCs in the air flow 3 will also be removed in the catalytic zone 9. However, the "pre-treatment" of the air flow in the catalytic zone 9 in which the amines are removed, ensures that the subsequent photooxidation process works optimally.

The method and system according to the present invention thereby provides a very simplified air flow treatment method and system. The system has a compact structure, and can easily can be added to existing workplaces. The system and method further have the advantage that the pressure drop over the system is small and that said system uses much less energy for the removal process compared to the traditional amine/VOC removal systems and methods.

Figure 4:
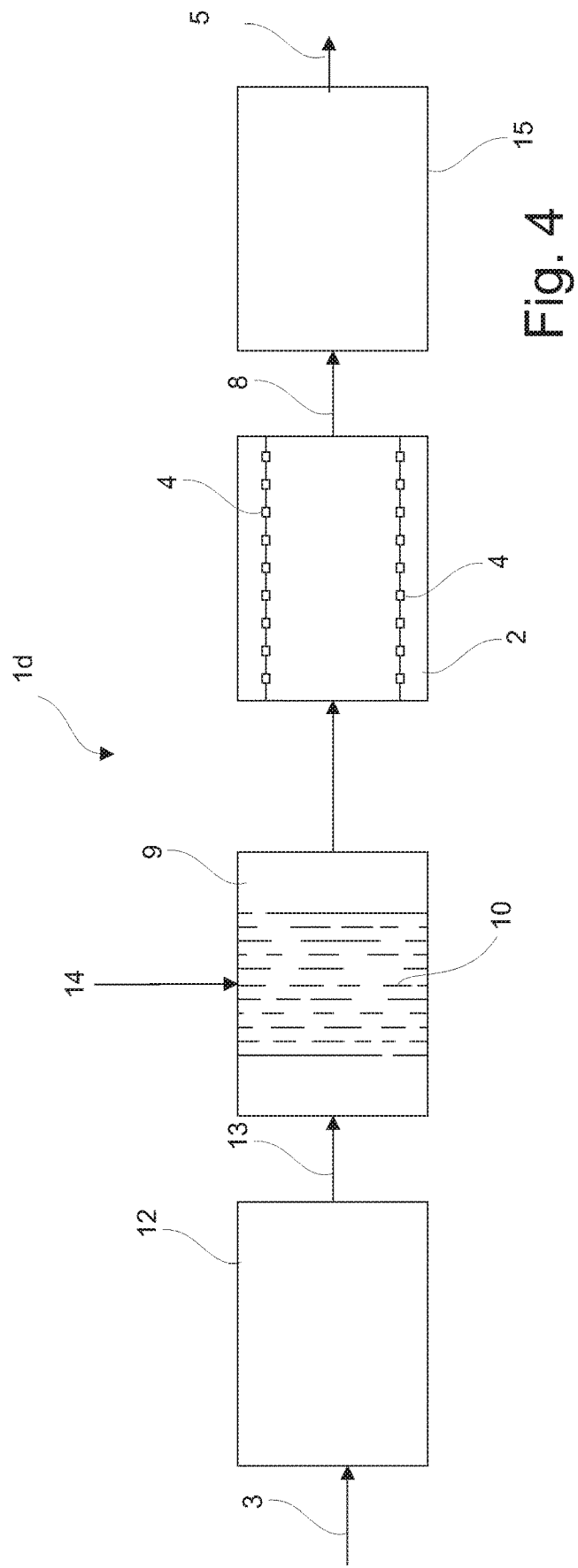
FIG. 4 shows schematically a forth embodiment of an air flow treatment system according to the present invention.

FIG. 4 shows a forth embodiment 1d of the system according to the invention. Said embodiment adds further details to the embodiment shown in FIGS. 1, 2 and 3, and for like parts the same reference numbers are used.

In this embodiment the air flow 3 passes through a temperature conditioning zone 12 before it enters the catalytic zone 9. Said conditioning zone 12 is arranged for providing a conditioned air flow 13, i.e. an air flow having a temperature between 80° C. and 225° C., preferably between 125° C. and 200° C., such that when the air flow 13 enters the catalytic zone 9, the conditions for oxidation and accordingly amine and VOC removal are optimal.

In order to ensure that sufficient oxidant is present in the catalytic unit 10, additional oxidant 14 may optionally be added to the catalytic zone 9. Said oxidant may be secondary air or oxygen. It is however preferred that said oxidant is ozone, since it is possible to shorten the retention time in the catalytic zone 9 and/or use smaller catalytic units 10 due to the strong oxidation capabilities of ozone.

Said additional oxidant 14 may also be added to the air flow just prior to the catalytic zone 9, e.g. provided in a second gas line connected to an air flow line/pipe.

In order to ensure that the UV-lamps operate at highest efficiency, a water spray system (not shown) may be installed in the photooxidation zone 2 to increase the relative humidity and/or absolute water content of the first treated gas stream to at least above 90%.

Even though the residuals from the photooxidation process consist mainly of carbon dioxide and water, it may in some situations, depending on the compounds/compounds in the air flow, be advantageously to subject the air flow exiting the photooxidation process, to a second treatment zone 15, e.g. arranged for removing particle contamination and/or one or more by-product. The second treatment zones may accordingly be a condensation zone and/or a scrubber, and/or an electrostatic precipitation, mechanical filtration (HEPA, ULPA etc), non-thermal plasma processes etc. or other conventional means for removing particular matters from an air flow. A person skilled in the art, will understand that there may be more than one second treatment zone. Even though the second treatment zone is located after the photooxidation zone in FIG. 4, said means for removing e.g.

particular matters from the air flow could also be placed before the catalytic zone, or both before and after.

Photooxidation is a destruction process and some of the resultant by-products e.g. water, and inert salts, cannot be emitted into the semiconductor clean room. In an alternative embodiment, the second treatment zone 15 may be arranged for removing said by-products from the first and/or second treated air stream. A person skilled in the art will understand that several kinds of further treatment zones may be provided, e.g. both for removing particular matter and/or by-products.

In order to ensure that the amine is complete removed from the air flow 3 before said air flow is introduced into the semiconductor clean room, the air flow may pass though more than one catalytic zone 9 before entering the photooxidation zone 2, and/or the air flow 3 may pass though more than one photooxidation zone 2 in order to ensure that any residues of the amine is not introduced into the semiconductor clean room.

Figure 5:
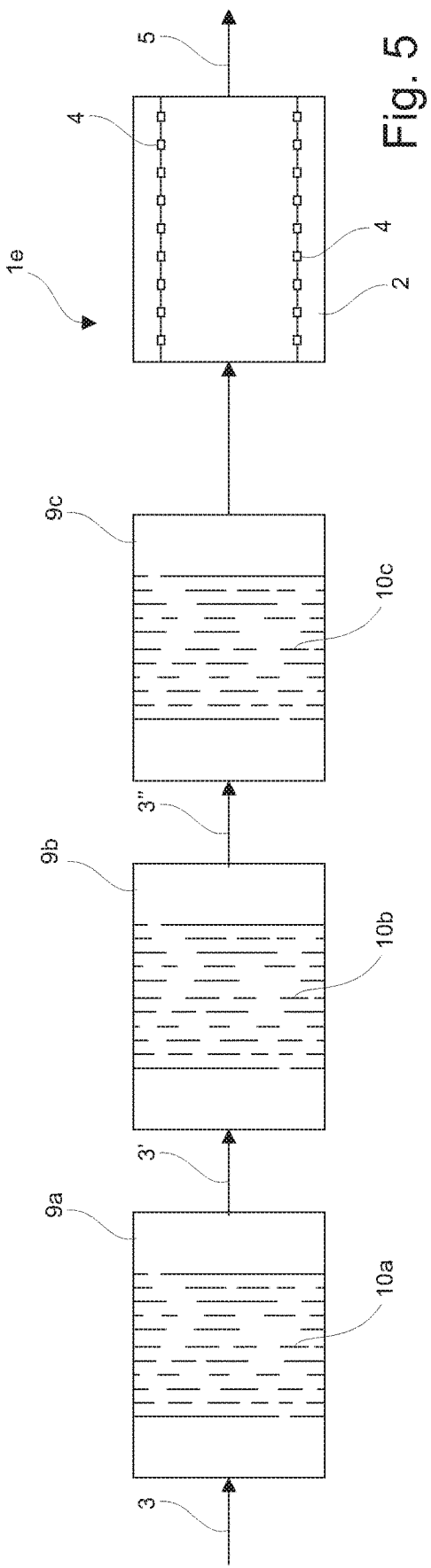
FIG. 5 shows schematically a fifth embodiment of an air flow treatment system according to the present invention.

In the embodiment shown in FIG. 5 the air treatment system le comprises three catalytic zones, 9a,9b,9c and the air flow 3 passes all three before entering the photooxidation zone 2. Thus, if the concentration of the amine is not reduced sufficiently in a first catalytic zone 9a, i.e. the remaining concentration of said compound can either not be completely removed in the photooxidation process or said compound will still influence the photooxidation process negatively, the concentration of the amine in the air flows 3', 3" can be further reduced in the two subsequent catalytic zones 9b and 9c, respectively. At this stage, the concentration of the amine is reduced to an acceptable level, i.e. below a predetermined threshold in which the amine is either completely removed, i.e. converted into one or more hydrocarbons, and/or the concentration of said amine is so low that it can be removed in the subsequent photooxidation step(s).

The three catalytic zones may either be identical i.e. they are arranged for reducing the concentration of the same vapour phase component (e.g. diphenylamine), and/or the three catalytic zones may be different, i.e. they may be arranged for reducing the concentration of three different compounds (e.g. diphenylamine; tricresyl phosphate and vinyltris(methylethylketoxime)-silane.

The number of catalytic zones 9a,9b,9c the air flow 3 passes though may vary depending on the content of the relevant air flow and the efficiency of said catalytic zones, but there may be e.g. two, three, four or even higher numbers of catalytic zones if required, the only requirement being that the concentration of the at least one vapour phase compound in the treated air steam 5 is so low that it can be introduced into the semiconductor clean room without compromising the semiconductor clean room, i.e. the criteria's for the semiconductor clean room are meet.

Figure 6:
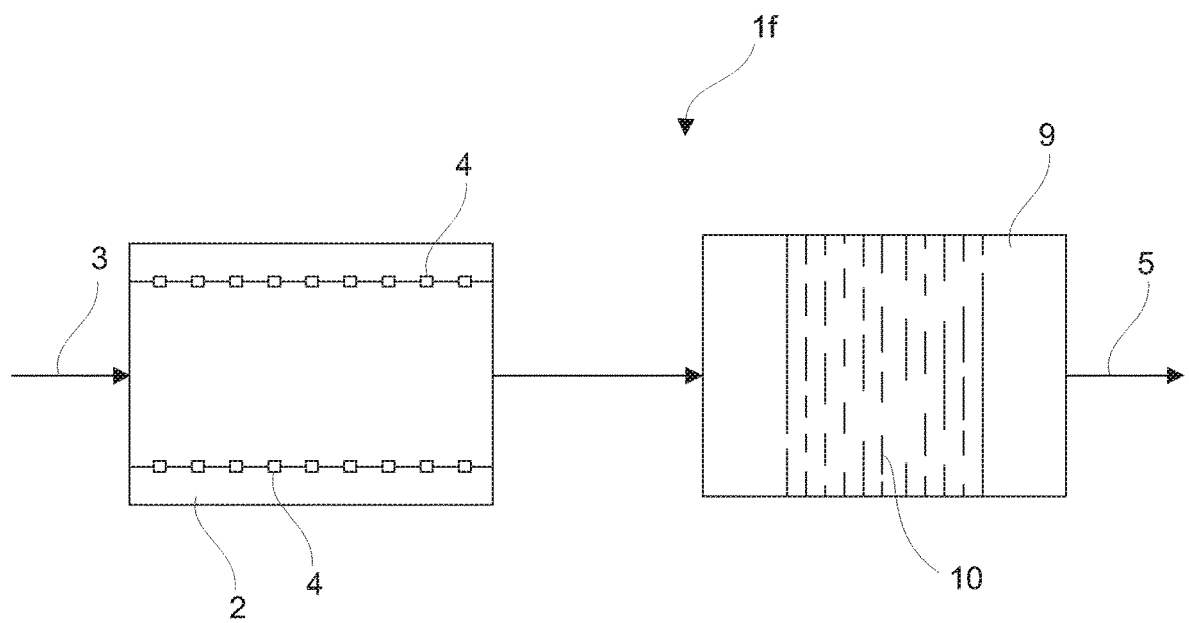
FIG. 6 shows schematically a fifth embodiment of an air flow treatment system according to the present invention.

A further embodiment if according to the invention is shown in FIG. 6, where the photooxidation zone 2 is arranged before the catalytic zone 9. Said catalytic zone may e.g. be arranged for removing ozone generated in the photooxidation step. The catalytic zone 9 is preferably operated at the same temperature as the air in the clean room, e.g. between 15-25° C., preferably around 20-22° C. whereby the air flow 3 neither has to be heated nor cooled, thereby providing a highly energy effective system and method according to the invention.

The number of photooxidation zones 2 and catalytic zones 9 can be varied, they can be placed in any suitable order, e.g. alternating, having a number of consecutively photooxidation zones and a number of catalytic zones 9, the only requirement being that the concentration of the at least one vapour phase compound is reduced below a predefined threshold value, such that the treated air flow can be passed into a semiconductor clean room.

Accordingly, the air flow treatment systems according to the preset invention can be constructed to meet different demands, depending on the compounds/compounds in the air flow such that several different vapour phase compounds can be removed by passing the air flow though a number of identical and/or different, and e.g. subsequently arranged, catalytic zones and/or photooxidation zones.

Modifications and combinations of the above principles and designs are foreseen within the scope of the present invention.

The invention claimed is:

1. An air treatment method arranged for treating an air flow to be entered into a semiconductor clean room, said air flow comprises at least one vapor phase compound, and wherein the air flow is subjected to at least one treatment process arranged for reducing the concentration of the at least one vapor phase compound in the treated air flow below a predefined threshold, and wherein a first treatment process of the treatment process comprises the steps of:
    passing the air flow through at least one catalytic zone, and
    subjecting the air flow to at least one photooxidation step, wherein said step comprises emitting, using at least one excimer lamp, a wavelength in the range between 126 nm and 240 nm, and
wherein the air flow is passed through the at least one catalytic zone before entering the at least one photooxidation step, and
wherein the least one vapor phase compound is an anime and the catalytic zone comprises a deNOx-catalyst and an oxidation catalyst, and wherein the air flow further comprises an organic compound selected from VOC's, silanes, phosphates, siloxanes, halocarbons and organometallic compounds.

2. The air treatment method according to claim 1, wherein the threshold for the at least one vapor phase compound in the air flow is below 500 ppt.

3. The air treatment method according to 1, wherein decomposition of the at least one vapor phase compound provides one or more decomposition compounds, and wherein the first treatment process comprises several consecutively arranged photooxidation steps, such that decomposition products generated in a first photooxidation step is further decomposed in one or more subsequent photooxidation steps, until the only decomposition products remaining in the air flow is carbon dioxide and water.

4. The air treatment method according to any of the 1, wherein the treatment process comprises one or more second treatment processes arranged for removing one or more decomposition compounds from the air flow before said air flow enters into the semiconductor clean room.

5. The air treatment method according to 28, wherein the photooxidation step comprises an $UV-O_3$ photooxidation process.

6. A semiconductor clean room air treatment system, said semiconductor clean room air treatment system comprises at least one photooxidation zone and at least one catalytic zone, whereby the semiconductor clean room air treatment system is arranged such that the concentration of the at least one vapor phase compound in an air flow is reduced below a predefined threshold, wherein the at least one catalytic zone is arranged before the at least one photooxidation zone, seen in the flow direction, wherein the catalytic zone comprises a $deNO_x$-catalyst and an oxidation catalyst and wherein the air flow to be treated comprises at least one amine, and wherein said photooxidation zone comprises at least one excimer lamp arranged for emitting a wavelength in the range between 126 nm and 240 nm.

7. The semiconductor clean room air treatment system according to claim 6, wherein the predefined threshold of the at least one vapor phase compound in the air flow is below 500 ppt.

8. The semiconductor clean room air treatment system according to claim 6, wherein said system comprises several consecutively arranged photooxidation zones.

9. The semiconductor clean room air treatment system according to claim 6, wherein said system comprises one or more additional treatment zones arranged for removing one or more by-products and/or particle contamination from the air flow, before said air flow enters the semiconductor clean room.

10. The semiconductor clean room air treatment system according to 6, wherein the catalytic zone is operated at a temperature between 80° C. and 225° C.

11. The semiconductor clean room air treatment system according to claim 10, wherein the system further comprises a conditioning zone arranged before the catalytic zone, and wherein said conditioning zone comprises a heating unit arranged for heating the air flow to and/or maintaining the air flow at a temperature of between 80° C. and 225° C.

12. The semiconductor clean room air treatment system according to claim 6, wherein the at least one photooxidation zone comprises at least one UV-lamp operating in an UV-spectrum arranged for generate ozone, and at least one UV-lamp operating in an UV-spectrum arranged generating hydroxyl radicals.

13. The semiconductor clean room air treatment system according to claim 6, wherein the at least one excimer lamp is arranged for emitting a wavelength of about 172 nm.

14. The semiconductor clean room air treatment system according to claim 13, wherein the photooxidation zone is arranged such that at least 90% of the air flow will be exposed to irradiation in said photooxidation zone.

15. An air filtering system for use in a semiconductor clean room, said air filtering system comprises a semiconductor clean room air treatment system of claim 6 and an additional treatment unit arranged for removing particle contamination from said air flow-and/or by-products from the air flow.

16. A semiconductor clean room comprising the semiconductor clean room air treatment system of claim 6.

17. A semiconductor clean room comprising the air filtering system of claim 15.

* * * * *